April 8, 1958     C. H. JACOBSON     2,829,573

SELECTIVE DOUBLE EXPOSURE PREVENTION DEVICE

Filed Dec. 29, 1954

INVENTOR
CARL H. JACOBSON.
BY
ATTORNEYS

United States Patent Office 2,829,573
Patented Apr. 8, 1958

2,829,573

SELECTIVE DOUBLE EXPOSURE PREVENTION DEVICE

Carl H. Jacobson, Binghamton, N. Y., assignor to General Aniline & Film Corporation, New York, N. Y., a corporation of Delaware Application December 29, 1954, Serial No. 478,393

3 Claims. (Cl. 95—31)

The present invention relates to cameras and is more particularly directed to a novel mechanism for preventing double exposures in a roll film camera.

There are numerous double exposure prevention devices in use and, as is well known, the purpose of such a device is to make it impossible to actuate the shutter again until the exposed film has been wound up and a new section of film advanced into position for the next exposure. The broad principle generally employed is to provide means for holding the shutter operating button in a depressed position until the new film has been advanced. In the conventional type of camera, the provision of such means is a simple problem.

The primary object of the present invention is to provide a double exposure prevention device which is not only adaptable for the conventional type of roll film camera but which is particularly applicable to a type of camera in which the lens is extensible into operative position. In this latter type of camera, a portion of the camera body which carries the camera lens, telescopes into the camera body when not in use. In the usual camera construction, the shutter lies adjacent the lens and is connected through a suitable link arrangement to the shutter actuating button. In the conventional type of double exposure prevention device, an interlock is provided between the shutter actuating button and the film winding mechanism to prevent further operation of the winding mechanism until the shutter is actuated. In the telescopic type of camera described above, since the shutter operating button is mounted on the movable part of the camera and, therefore, moves with respect to the film winding mechanism, a special form of interlock is provided between the button and the film winding mechanism.

A further object of the invention is to provide a novel interlock between the shutter actuating button or trigger and the film winding mechanism whereby the trigger can be moved to operative position without advancing the film to enable a deliberate double exposure to be made subject to the operator's disposition.

A still further object of the invention is the provision of a device of the class described which is relatively simple in structure, easy to operate and highly effective in use.

Other objects and advantages of the invention will become apparent from the following description taken in connection with the accompanying drawing wherein.

Figure 1:
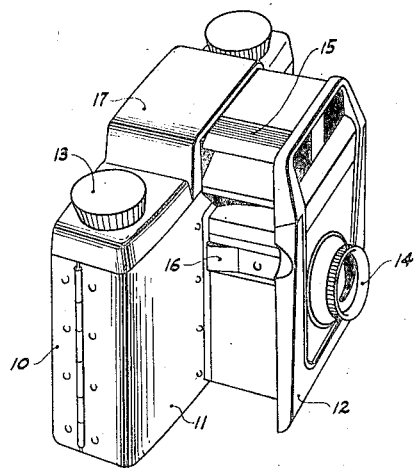
Fig. 1 is a perspective view of a camera to which the present novel device has been applied.

Referring to the drawing in detail and particularly Fig. 1, numeral 10 indicates the camera to which the present invention is applied. The camera is of the telescopic type and comprises a main body portion 11 and the telescopic section 12. The main body portion houses the film spools and film and supports the externally mounted winding knob 13. The telescopic section 12 carries the lens 14, the shutter mechanism (not shown), and the shutter release element in the form of a pivoted plate 15. Suitable spring locking means 16 is provided to hold the telescopic section in extended position, said means being releasable to permit section 12 to telescope within the main body portion with the plate 15 concealed within the hood 17.

Figure 2:
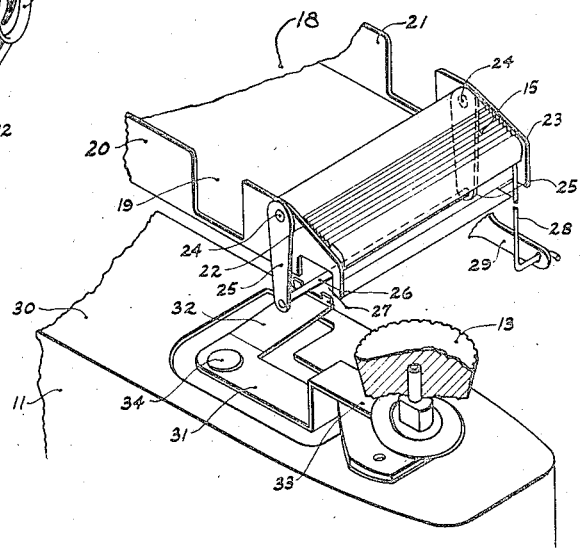
Fig. 2 is an enlarged detail view of a portion of the camera showing the trigger mechanism in extended position.
Figure 3:
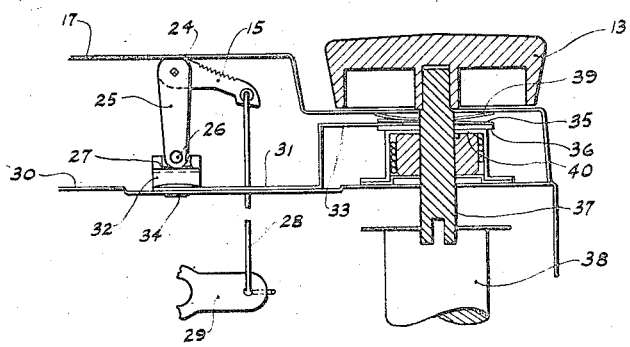
Fig. 3 is an enlarged sectional view of the present invention with the trigger mechanism in telescoped position.

Referring to Figs. 2 and 3, the plate 15 is shown supported by a structural member 18 consisting of a lower wall 19 and parallel, upstanding walls 20 and 21 between which the plate 15 is pivotally supported. As seen in Fig. 2, the normal position of the plate 15 is slightly inclined with respect to the horizontal and the top edges of the side walls 20 and 21, which adjacent the shutter release plate 15 terminate in inclined edges 22 and 23. The plate 15 pivots on the trunnions 24 to which are rigidly secured depending levers or arms 25, to the lower ends of which a rod 26 is secured. The above structure results in a rigid unit fulcrumed at the aforementioned trunnions. Slots 27 are provided in the side walls to receive the rod 26 and permit limited movement thereof upon pivotal movement of the plate 15. The latter at its front end supports a freely pivoting link 28, the lower end of which is pivoted to the shutter operating lever 29. The above described components in final assembly become a functional part of the camera and when in telescopic closed position extend above the upper wall 30 of the main body portion 11.

The shutter release plate resetting mechanism comprises an L-shaped lever 31, one leg of which has an upwardly extending, forked flange 32 and the other leg terminating in an offset portion 33. The lever 31 is fulcrumed to wall 30 by a shoulder rivet 34 with its forked end 32 engaging the rod 26 whereby displacement of the lever 31 at its fulcrum occurs upon movement of the plate 15 and vice versa. The offset portion 33 is frictionally received between the washers 35 and 36 (as seen in Fig. 3) which are keyed to rotate with shaft 37 which winds the film spool 38. Spring member 39 pressing washers 35 and 36 against member 40, causes an appropriate frictional grip on offset 33 to effect movement thereof but permitting a certain amount of "drag" for a purpose hereinafter described.

In operation, when first winding the film on the film spool 38, the knob 13 is manually turned to transmit rotary motion to the film spool. The drag on lever 31 resulting from rotation of the washers 35 and 36 causes angular displacement of the lever and through the connection between the forked end of the lever and the rod 26, effects a resetting of the release plate 15. Because of the frictional engagement between portion 33 of the lever and washers permitting slippage between the lever and washers, the shaft 37 may continue to rotate during the winding operation without further angular displacement of the lever. Upon downward movement of release plate 15, the lever is angularly displaced and restored to its original position and retained in this position through the frictional engagement of the lever and the washers. Since downward movement of the plate 15 operates the shutter mechanism, and since upon this downward movement the release plate 15 remains in a depressed position, further movement and attendant shutter operation is prevented until the plate 15 is reset when film is advanced by further rotation of the winding knob 13.

By virtue of the inherent friction built into the unit, the attained positions of members participating in the motion will be held until the cycle is repeated or until the release plate 15 is forced manually back to its upper position. This can be accomplished without rotating the winding knob, in which case desired double exposure becomes a possibility, subject to the operator's disposition. At the same time, the downward retention of the release plate 15 is an indication to the operator that an exposure has been made.

From the foregoing description, it is readily apparent that the relatively simple structure shown is well adapted to accomplish the objects and advantages of the present invention. Although a preferred embodiment has been shown, it will be understood that minor changes may be made in the details of construction without departing from the spirit of the invention as defined in the appended claims.

I claim:

1. In a camera having a main body portion and a telescopic section, a shutter actuating release plate adapted to remain in downward position after manual actuation mounted on said section for pivotal movement thereon, a rod carried by said plate, a rotatable shaft for winding the film spool mounted in the main body portion, friction means mounted on said shaft to rotate therewith, an L-shaped lever fulcrumed to the main body portion and being angularly displaceable with respect thereto, said lever having one leg engaging said rod and having the other leg in engagement with said friction means, said plate being returned to upward position by said lever upon rotation of said shaft.

2. In a camera having a main body portion and a telescopic section, a shutter actuating plate mounted on said section for pivotal movement thereon, a rod carried by said plate, a rotatable shaft for winding the film spool mounted in the main body portion, friction means mounted on said shaft to rotate therewith, an L-shaped lever fulcrumed to the main body portion and being angularly displaceable with respect thereto, said lever having one leg operatively connected to said rod and having the other leg in frictional engagement with the friction means, said plate remaining in downward position but being returnable manually by the operator when double exposure is desired.

3. In a camera of the roll film type having a main body portion and a telescopic section, a rotatable shaft for winding a film spool mounted in the main body portion, a shutter actuating plate pivotally mounted on said telescopic section, a rod carried by the lower end of said plate, friction washers mounted on the rotatable shaft, an L-shaped lever fulcrumed to the main body portion, said lever having one leg terminating in a forked portion adapted to receive said rod, said lever having its other leg engageable with the friction washers, said plate being downwardly movable for actuation of the shutter and during said movement causing angular displacement of said lever and remaining in downward position until the forked portion of said lever, upon rotation of said shaft, returns said plate into its original position.

References Cited in the file of this patent

UNITED STATES PATENTS

| | | |
|---|---|---|
| 2,011,567 | Carpenter | Aug. 20, 1935 |
| 2,507,156 | Harvey | May 9, 1950 |
| 2,541,289 | Richartz | Feb. 13, 1951 |
| 2,742,835 | Owens | Apr. 24, 1956 |

FOREIGN PATENTS

| | | |
|---|---|---|
| 604,389 | Germany | Oct. 19, 1934 |
| 105,185 | Austrialia | Sept. 15, 1938 |
| 694,571 | Great Britain | July 22, 1953 |